(12) United States Patent  
McNally

(10) Patent No.: US 6,898,253 B2
(45) Date of Patent: May 24, 2005

(54) METHOD AND APPARATUS FOR AN ACCURATE SLICER THAT CAN RAPIDLY ADJUST TO AN OFFSET

(75) Inventor: Conor J. McNally, Co. Louth (IE)

(73) Assignee: Ceva Communications Limited, Dublin (IE)

( * ) Notice: Subject to any disclaimer, the term of this patent is extended or adjusted under 35 U.S.C. 154(b) by 802 days.

(21) Appl. No.: 09/837,702

(22) Filed: Apr. 17, 2001

(65) Prior Publication Data

US 2002/0001354 A1 Jan. 3, 2002

Related U.S. Application Data

(60) Provisional application No. 60/200,529, filed on Apr. 27, 2000.

(51) Int. Cl.[7] ............................................... H04L 25/10
(52) U.S. Cl. ...................................................... 375/317
(58) Field of Search ................................. 375/317, 324, 375/232, 233

(56) References Cited

U.S. PATENT DOCUMENTS

| 4,771,188 A | | 9/1988 | Cheng et al. |
| 5,508,855 A | * | 4/1996 | Hutchins et al. ............... 360/46 |
| 5,521,941 A | | 5/1996 | Wiatrowski et al. |
| 6,115,429 A | * | 9/2000 | Huang ......................... 375/317 |
| 6,163,580 A | * | 12/2000 | Jackson et al. .............. 375/317 |

* cited by examiner

Primary Examiner—Chieh M. Fan
Assistant Examiner—Kevin Kim
(74) Attorney, Agent, or Firm—Blakely, Sokoloff, Taylor & Zafman LLP

(57) ABSTRACT

A method that calculates a threshold for a signal according to a first bandwidth if the signal is greater than the threshold plus a first value or if the signal is less than the threshold minus the first value. The method also calculates the threshold for the signal according to a second bandwidth if the signal is not greater than the threshold plus the first value and if the signal is not less than the threshold minus the first value. The first bandwidth is greater than the second bandwidth. Various apparati that perform the method are also described.

31 Claims, 6 Drawing Sheets

METHOD AND APPARATUS FOR AN ACCURATE SLICER THAT CAN RAPIDLY ADJUST TO AN OFFSET

CLAIM FOR PRIORITY

The present application hereby claims the benefit of U.S. provisional application 60/200,529 filed on Apr. 27, 2000.

FIELD OF INVENTION

The field of invention relates generally to signal processing; and, more specifically, to a method and apparatus for an accurate slicer that can rapidly adjust to an offset.

BACKGROUND

FIG. 1 shows an example of a BLUETOOTH packet structure 120. The packet may be viewed as having two parts: 1) an access code 125; and 2) the remainder of the packet 160. The remainder of the packet 160 typically includes a packet header and the random "customer" data the packet is responsible for transporting. The access code 125 is unique to the piconet master for the connection between the transmitting device 165 and the receiving device 166. In BLUETOOTH applications, the access code 125 includes a 4 bit preamble 121, a 64 bit synchronization word 122, and a 4 bit postamble 123.

The synchronization word 122 (which may also be referred to as a synch word, synchronization code, synch code, and the like) is unique to the piconet master used in the connection. Upon the reception of a packet at the receiving device 166, the receiving device 166 "checks" the synchronization word 122 embedded within the packet. If the synchronization word 122 matches a pseudo random sequence unique to the piconet master for a connection that includes the receiving device 166, the receiving device 166 understands that the incoming packet is intended for the receiving device 166.

FIG. 2 shows an exemplary embodiment of some of the functional blocks within the receiving device that may be used to perform the above described synchronization word 122 check. FIG. 2 shows a receive channel 209 having a demodulator 206 followed by a plurality of functional components. For BLUETOOTH applications, demodulator 206 corresponds to a frequency shift keyed (FSK) demodulator (which may be implemented as a frequency to voltage converter). An analog to digital converter 201 receives the demodulator 206 output signal 255.

The demodulator 206 output signal 255 may also be referred to as a baseband signal 255. The baseband signal 255 may be filtered, amplified (or processed in other ways) between the demodulator 206 output and the A/D converter 201 input. For purposes of discussing exemplary embodiments, the baseband signal 255 (as it exists prior to processing by the A/D converter 201) may be viewed as an analog signal.

The analog to digital converter 201 is responsible for converting the analog baseband signal 255 into a series of words having values representative of the analog baseband signal waveform. Words are a plurality of bits (where the number of bits may be given generically as "n"). An A/D converter 201 output word may also be referred to as a sample, an output sample, an output word sample, and the like.

The A/D converter output signal 203 is provided to a slicer unit 210. The slicer unit 210 converts the A/D output signal 203 into samples of recovered symbols. That is, note that the pulses 211a,b, 212a,b, 213a,b observed in both the baseband signal 255 and the A/D converter output signal 203 are representative of 1s or 0s being transmitted from the transmitting device to the receiving device.

The slicer unit 210 effectively identifies the presence of each pulse 211a,b, 212a,b, 213a,b and reports the binary value (i.e., a "1" or a "0") of each A/D converter output sample to the correlator 221 (as seen in the slicer output signal 222 of FIG. 2). For example, the slicer unit 210 may be designed to make a determination of the average value of the A/D converter output signal 203 and threshold the individual values of the A/D converter output signal 203 against this average value.

FIG. 2 shows an example. The average value of the A/D converter output signal 203 is seen at word value level 217. The slicer unit 210 determines this level 217 based upon the observed data stream from the A/D converter 201 (e.g., by continually averaging its output values). The slicer unit 210 converts A/D output values into "1"s or "0"s based upon their position with respect to the threshold level 217.

That is, A/D converter output signal 203 values above the threshold level 217 are given a value of "1" by the slicer unit 210 while A/D converter output signal 203 values below the threshold value 217 are given a value of "0" by the slicer unit 210. The activity of deciding whether a signal is a "1" or a "0" based upon its level with respect to a reference (such as threshold 217 mentioned above) may be referred to as slicing, thresholding, comparing and the like. The slicer unit output signal 222 is shown in FIG. 2. Note that it traces a digital symbol signal 224 which is shown in FIG. 2 for conceptual ease. Digital symbol signal 224 does not need to actually exist at the slicer 210 output.

The correlator unit 221 performs a correlation between the received synchronization word and the synchronization word that the receiving device is "looking for". A correlation employs a mathematical process (e.g., a "convolution") which may be implemented with electronic circuitry or software. The correlation provides a measurement of the likeness between two signals.

To perform the aforementioned synchronization word check, the received synchronization word from the slicer unit 210 is correlated with the synchronization word that is unique to the piconet master of the receiving device's connection. This helps the receiving device understand their likeness with respect to one another. If they are deemed to have an acceptable amount of likeness, the synchronization words are deemed to be the same and the received packet is regarded as being intended for the receiving device.

Frequency shift keyed (FSK) communication (which is used in BLUETOOTH applications) suffers if deviations exist from the "designed for" carrier frequency within the transmitting device and/or the "designed for" downconversion frequency within the receiving device. As the deviations in carrier and/or downconversion frequency may be viewed as errors in frequency; and, as FSK demodulation may be viewed as a form of frequency to voltage conversion—it follows that these frequency errors are reproduced as voltage errors in the baseband signal 255. Specifically, referring to FIG. 3, an offset 356 from the baseband signal's "designed for" DC level 301 arises.

FIG. 3 shows an exemplary A/D converter output signal 355 as it interprets an analog baseband signal having an offset 356 as described above. In the depiction of FIG. 3, at time Tx, the transmitting device begins to transmit a signal at the carrier frequency causing a "jump" in the received baseband signal (as a result of the aforementioned frequency error(s)) from nominal DC level 301 to offset level 356. After an amount of time Tg, the transmitting device begins to transmit the packet at time T0. In some applications the amount of time Tg is deliberately imposed by the transmitting device to help the receiving device adjust to the offset 356; however, note that this particular transmitter design approach is not necessary in all applications.

FIG. 3 also shows a depiction of an exemplary response of the slicer threshold level 312 to the offset 356. Generally, if a slicer is designed to accurately calculate the threshold level (e.g., by calculating an average over a lengthy run of the baseband signal) the threshold level 312 will slowly respond to the offset 356. Thus, as seen in FIG. 3, the slicer threshold level 312 does not fully adjust to the offset 356 until time T1.

As a result of the lengthy adjustment period of the slicer's threshold level (i.e., between time period between Tx and T1), the output signal of the slicer (which is shown as digital symbol signal 314) corresponds to a lengthy incorrect interpretation of the baseband signal. A correct interpretation, shown as correct digital symbol signal 315, is also provided in FIG. 3 for comparison. An extended incorrect interpretation may result in a low correlation value, eventhough the synchronization word of the packet being received possess the pattern being correlated for. This results in the receiver improperly deciding that the packet should be ignored.

SUMMARY

A method that calculates a threshold for a signal according to a first bandwidth if the signal is greater than the threshold plus a first value or if the signal is less than the threshold minus the first value. The method also calculates the threshold for the signal according to a second bandwidth if the signal is not greater than the threshold plus the first value and if the signal is not less than the threshold minus the first value. The first bandwidth is greater than the second bandwidth. Various apparati that perform the method are also described.

FIGURES

The present invention is illustrated by way of example and not limitation in the figures of the accompanying drawings.

DESCRIPTION

Figure 1:
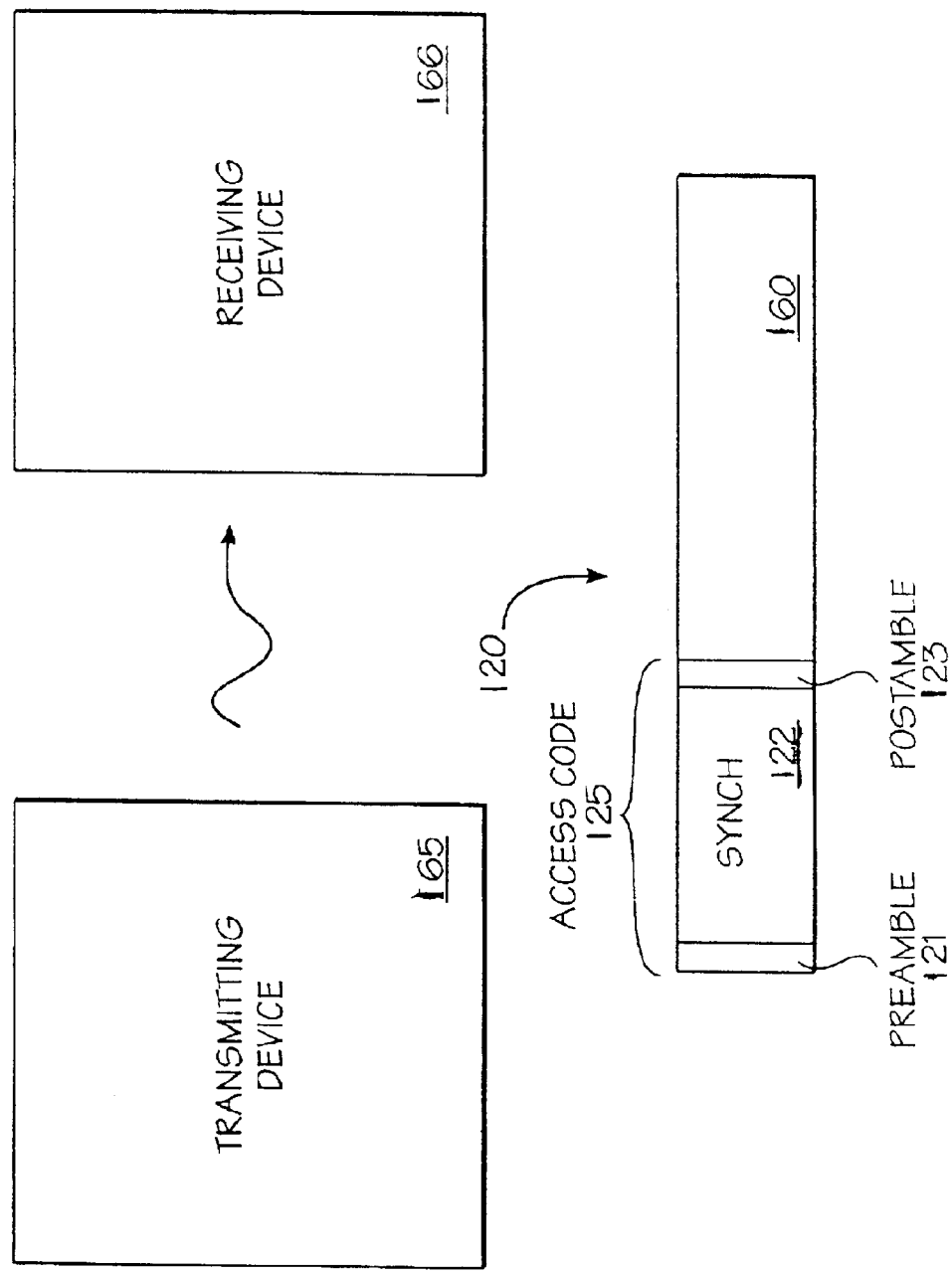
FIG. 1 shows the structure of a BLUETOOTH packet.

A method calculates a threshold for a signal according to a first bandwidth if the signal is greater than the threshold plus a first value or if the signal is less than the threshold minus the first value. The method also calculates the threshold for the signal according to a second bandwidth if the signal is not greater than the threshold plus the first value and if the signal is not less than the threshold minus the first value. The first bandwidth is greater than the second bandwidth. Various apparati that perform the method are also described.

Recall from the discussion in the background that the greater amount of time consumed in adjusting a slicer's threshold level to an offset in the baseband signal corresponds to a greater likelihood that a received packet having the "sought for" sychronization word will be improperly disregarded by the receiving device. Thus, a solution to the problem is to implement a threshold calculation technique that is able to rapidly adjust to a sudden offset in the baseband signal.

Note, however, that there is traditionally an inverse relationship between the ability of a threshold calculation technique to rapidly adjust to an offset and the accuracy of the threshold itself. That is, the faster a threshold can be made to adjust to an offset, the less accurate it becomes. For example, if the threshold calculation technique is implemented as a straightforward averaging of a fixed number "N" of the most recent A/D converter output samples, the threshold response time can be improved (i.e., reduced) by reducing the number of samples N.

By reducing the number of samples N used for averaging, each sample has a greater "weight" on the average. As such, an A/D converter output word value corresponding to a sudden jump in the baseband signal offset should have a significant effect on the average value in the direction of the offset (which corresponds to the threshold being rapidly adjusted to the offset).

As the number of samples N is increased, however, each sample has less weight on the average. As a result, a value corresponding to a sudden jump in the baseband signal offset should have a less significant effect on the average value in the direction of the offset (which corresponds to the threshold being adjusted more slowly to the offset). Thus, an increase in response time is achieved by decreasing the number N of averaging samples.

However, decreasing the number N of averaging samples (although providing for a faster response to an offset) corresponds to a less accurate threshold. Specifically, the threshold begins to follow each individual bit value rather than provide a precise average over a number of prior bit values. For example, a balanced baseband signal should exhibit approximately equal numbers of 1s and 0s over an extended run of bits. As such, an accurate threshold level corresponds to an average value of 0.5.

However even though an extended run of the baseband signal is typically balanced, if the baseband signal is analyzed to a high degree of resolution, unbalanced patterns will emerge. For example, a ten bit baseband signal run of 1011100100 has five 1s and five 0s. As such an accurate threshold level corresponds to 0.5. However, the first five bit section is an unbalanced pattern of 10111 and the last five bit section is an unbalanced pattern of 00100.

For these specific patterns, if the number of averaging samples N is set to a value that is coextensive with five baseband signal bits, the first five bit section will produce an average value that corresponds to 0.8 while the last five bit section will produce an average value that corresponds to 0.2. Thus, the threshold value itself will undesirably vary in response to the unbalanced portions of the baseband signal, rather than remain fixed at the correct value of 0.5.

Figure 3:
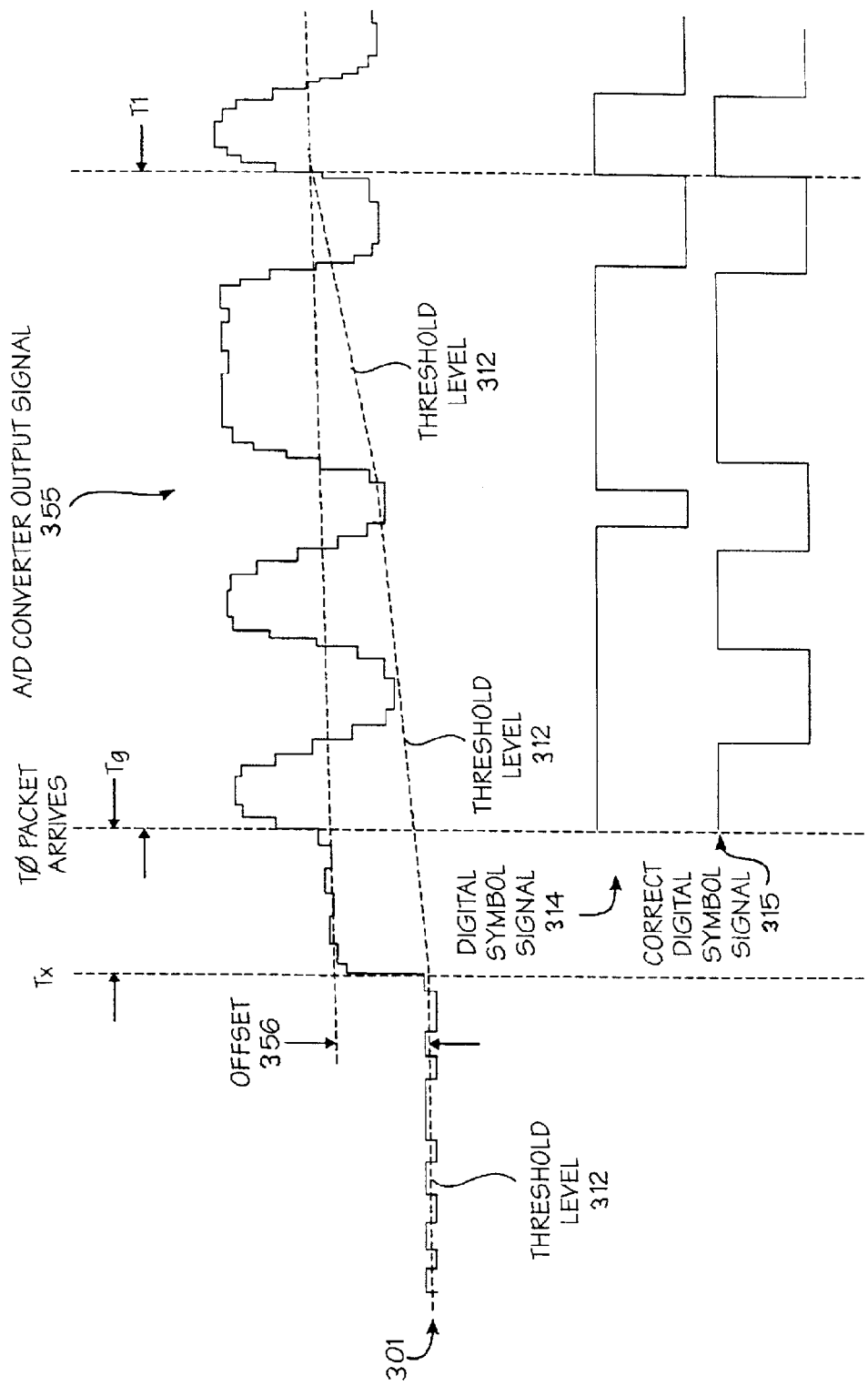
FIG. 3 shows the adjustment of a slicer threshold level to an offset in a baseband signal.

The variation in threshold level can cause improper baseband signal interpretation similar to that discussed and shown in the background with respect to FIG. 3. Thus, the desirable ability to rapidly adjust to an offset traditionally results in an undesirable inability to maintain a fixed and accurate threshold level. In a sense, because the threshold is able to adjust to the sudden appearance of an offset it also adjusts to the local imbalances within the baseband signal. As such, for traditional threshold calculation schemes, there is an inverse relationship between the ability of a threshold calculation technique to rapidly adjust to an offset and the accuracy of the threshold itself.

As a matter of terminology, the speed at which a threshold calculation technique adjusts to a baseband signal offset may be referred to as the bandwidth of the threshold calculation technique. That is, a threshold calculation technique that rapidly adjusts to an offset (e.g., by averaging over a small number N of A/D converter samples) may be said to have a high bandwidth; and, a threshold calculation technique that slowly adjusts to an offset (e.g., by averaging over a large number N of A/D converter samples) may be said to have a low bandwidth.

Figure 4:
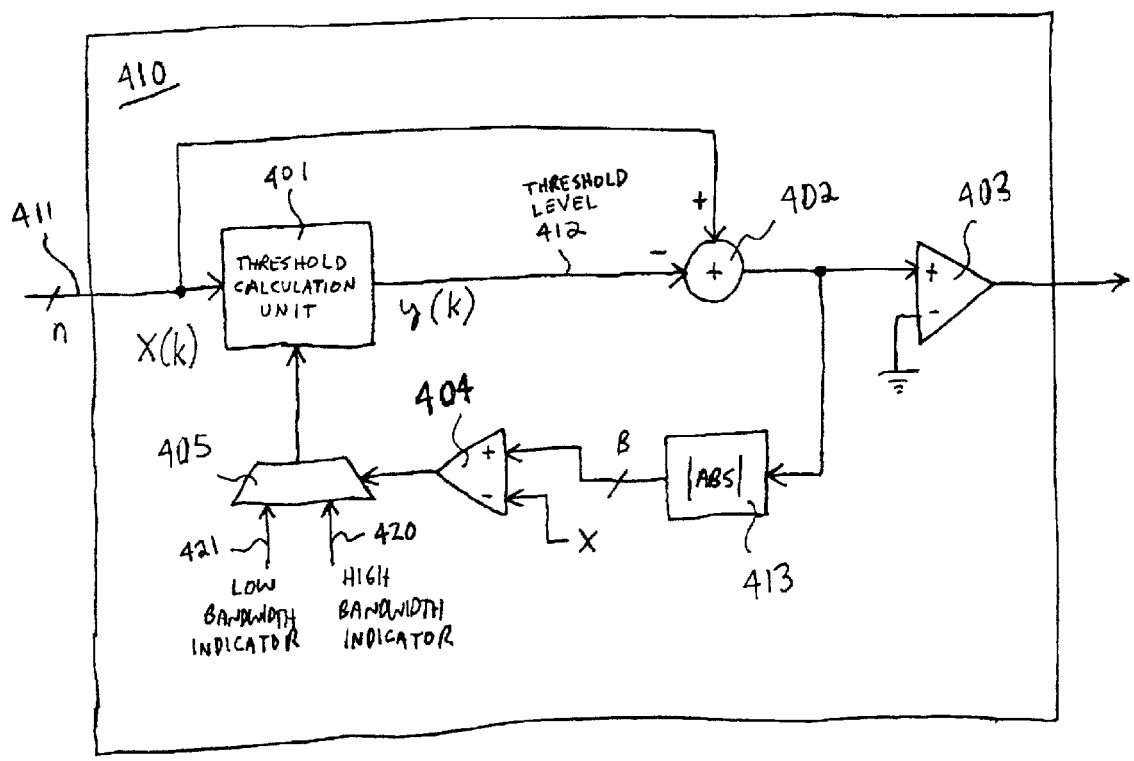
FIG. 4 shows an exemplary embodiment of a slicer that rapidly adjusts to a baseband signal offset and also provides accurate DC tracking of the baseband signal.

FIG. 4 shows an exemplary embodiment of a slicer unit 410 that not only rapidly adjusts its threshold to a baseband signal offset but also maintains a stable, accurate threshold for the baseband signal after the offset has been adjusted for. In the slicer embodiment 410 of FIG. 4, the slicer's threshold calculation unit 401 has two different bandwidths. A first, higher bandwidth can be used to rapidly adjust the threshold to a large offset in the baseband signal while a second, lower bandwidth is used to provide a stable, accurate threshold once the large offset in the baseband signal has been adjusted to. The second, lower bandwidth can also be utilized if no offset arises or, to the extent that an offset arises, the size of the offset is deemed not substantial enough to trigger application of the higher bandwidth threshold calculation process.

Figure 2:
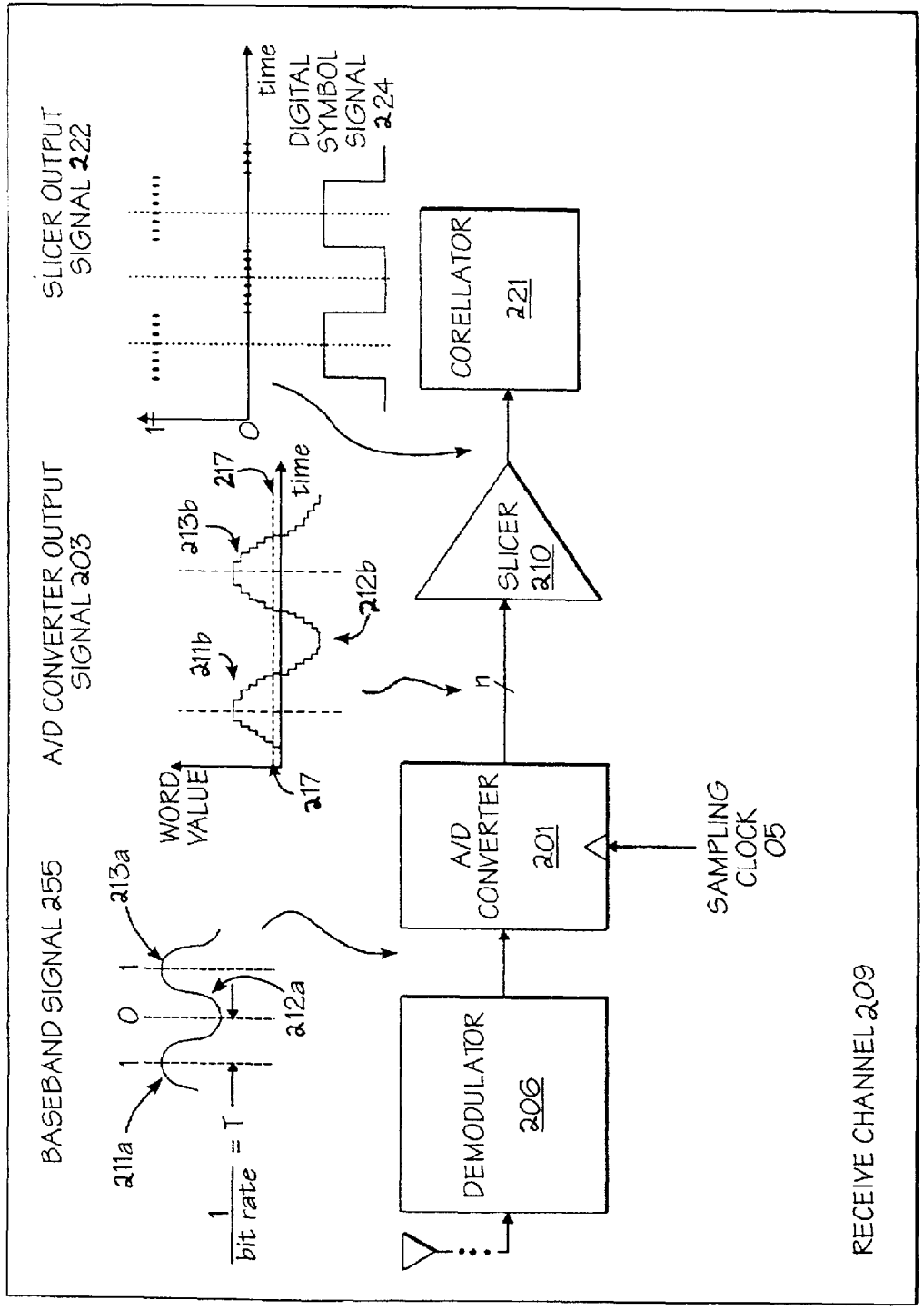
FIG. 2 shows a receiving device channel that receives a BLUETOOTH packet.

In the slicer embodiment 410 of FIG. 4, adder 402 and comparator 403 effectively provide the slicing function. That is, if the slicer input signal (which is provided at slicer input 411 and may, as seen in FIG. 2, correspond to the output signal 203 of an A/D converter), is greater than the threshold level (which is provided at the output 412 of the threshold calculation unit 401), the comparator 403 triggers a slicer 410 output value of "1"; and, if the slicer input signal is less than the threshold level, the comparator triggers a slicer 410 output value of "0".

Absolute value unit 413, comparator unit 404 and multiplexer 405 form a feedback loop that controls the bandwidth of the threshold calculation unit 401. According to the operation of the slicer unit 410 of FIG. 4, if the slicer input signal amplitude extends beyond a value of "X" above or below the threshold level, the threshold calculation unit 401 is triggered into a high bandwidth mode (where high bandwidth mode corresponds to a threshold calculation technique having the higher or two bandwidths). Correspondingly, if the slicer input signal falls within a value of "X" above or below the threshold level the threshold calculation unit 401 is triggered into a low bandwidth mode.

Thus, if the slicer input signal suddenly "jumps" an amount equal to or greater than X above or below the threshold (e.g., in the form of an offset), a high bandwidth threshold calculation technique is triggered. The high bandwidth threshold calculation technique allows the slicer's threshold to be rapidly adjusted to the offset. As the threshold approaches the offset, eventually, the slicer input signal will fall within an amount X of the threshold. This causes the threshold calculation technique to be triggered into a low bandwidth mode (which allows for subsequent accurate threshold calculation).

Figure 5:
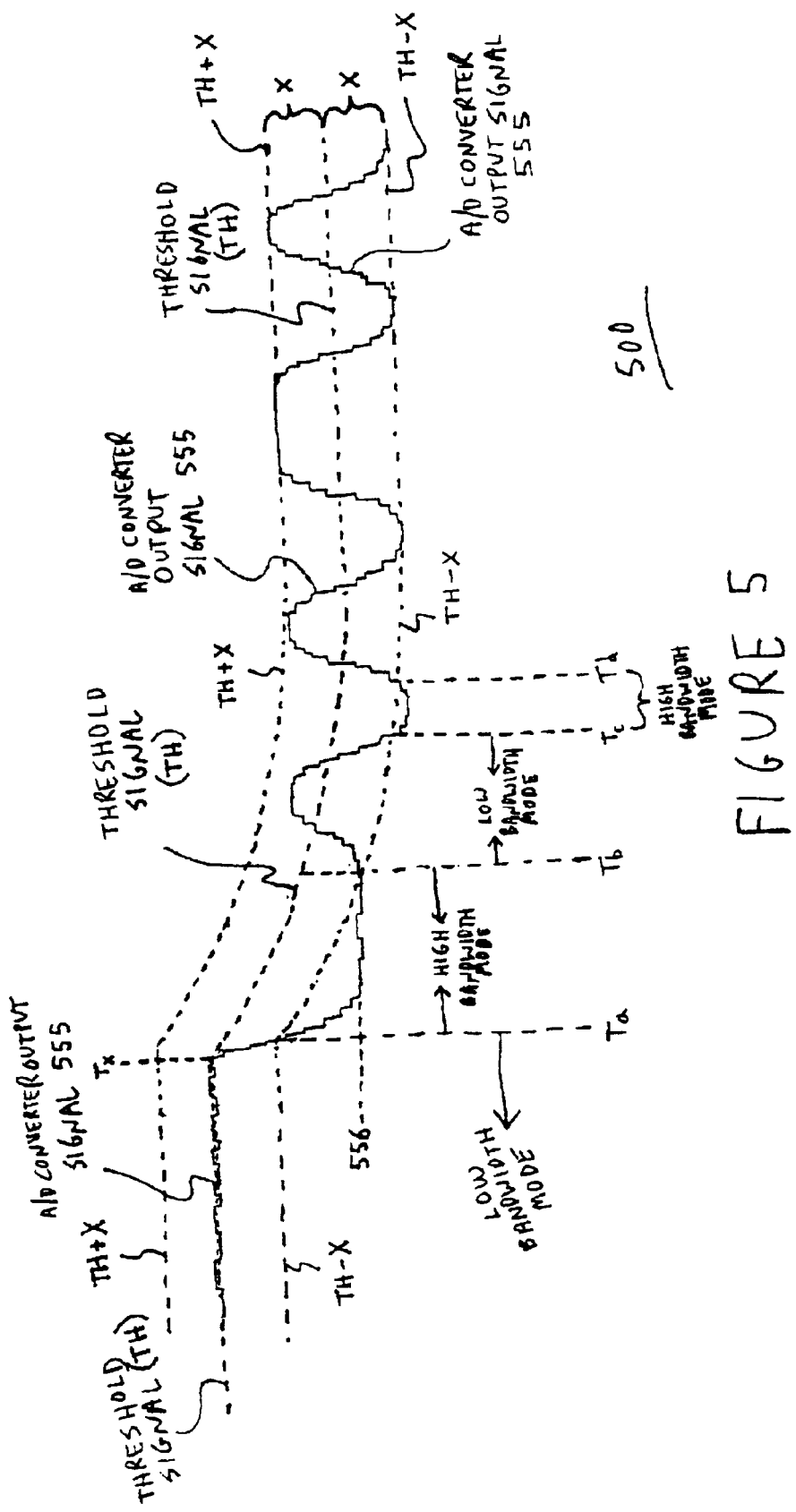
FIG. 5 shows an exemplary threshold adjustment provided by the circuit of FIG. 4.

FIG. 5 shows an exemplary embodiment of this process 500 in more detail. FIG. 5 shows an A/D converter output signal 555 that jumps to an offset level 556 at time Tx. In the embodiment of FIG. 5, the value "X" corresponds to the amplitude of the A/D converter output signal 555 waveform. That is, a value of "2X" corresponds to the peak to peak amplitude of the A/D converter output signal 555 waveform. Note that the threshold value TH, as well as values corresponding to TH+X and TH−X, are shown superimposed upon the A/D converter output signal 555.

When the A/D converter output signal 555 falls below TH−X or rises above TH+X, the threshold calculation technique is triggered into its high bandwidth mode. When the A/D converter output signal 555 falls between TH−X and TH+X, the threshold calculation technique is triggered into its low bandwidth mode. Thus, as seen in FIG. 5, for those moments prior to the time Tx when the transmitter enables its carrier frequency, the threshold detection unit 401 of FIG. 4 is set into its low bandwidth mode because the slicer threshold TH is accurately tracking the "signaless" A/D converter output.

After time Tx, the A/D converter output signal jumps to an offset 556. When (at time Ta) the A/D converter output signal 555 falls below TH−X in response to the offset, the threshold calculation technique is triggered into its high bandwidth mode. The threshold level TH, in response, is rapidly adjusted toward the offset level 556. After the threshold level TH begins to rapidly approach the offset level 556, eventually (at time Tb), the A/D converter output signal 555 rises above TH−X.

This causes the threshold calculation technique to be triggered back into its low bandwidth mode which; subsequently, results in a decrease in the rate at which the threshold level TH approaches the offset 556. As a result of the exemplary shape and nature of the A/D converter output signal 555 depicted in FIG. 5, the threshold calculation technique reenters it high bandwidth mode for a brief period (between times Tc and Td). After time Td, the threshold calculation technique employs a low bandwidth so that the threshold level TH accurately tracks the offset level 556 of the A/D converter output signal 555. As such, the threshold TH may also be referred to as a DC tracking signal.

Referring back to FIG. 4, the absolute value unit 413 presents the absolute value of the adder 402 output to the comparator unit 404. The comparator unit 404 toggles its output each time the output of the absolute value unit 413 crosses above or below a value of X. As the adder 402 output corresponds to the difference between the slicer input signal waveform and the threshold level TH, the comparator unit 404 output provides an indication as to whether or not the slicer input signal is: 1) below TH−X or above TH+X (i.e., "outside" TH+/−X); or 2) above TH−X and below TH+X (i.e., "between" TH−X and TH+X).

The comparator unit 404 output controls the channel select input of a multiplexer 405. In response to the comparator unit 404 output, multiplexer 405 provides either of a pair of bandwidth mode indicators 420, 421 to the threshold calculation unit 401. Specifically, if the comparator unit 404 output indicates that the slicer input signal is above TH+X or below TH−X, the multiplexer 405 provides the high bandwidth indicator 420 to the threshold calculation unit 401. Alternatively, if the comparator unit 404 output indicates that the slicer input signal is below TH+X and above TH−X, the multiplexer 405 provides the low bandwidth indicator 421 to the threshold calculation unit 401.

A bandwidth indicator 420, 421 provides an indication to the threshold detection unit 401 as to which bandwidth is to be employed by the threshold calculation unit 401. In one embodiment, the bandwidth indicators 420, 421 correspond to an input parameter used by the threshold calculation unit to set the appropriate bandwidth. For example, in an embodiment where the threshold calculation unit takes the average of a number N of A/D converter output samples, the bandwidth indicators 420, 421 provide the specific number of A/D converter output samples that should be averaged.

That is, the high bandwidth parameter 420 provides a first number N1 and the low bandwidth parameter 421 provides a second number N2 where N2 is greater than N1. In high bandwidth mode the threshold calculation unit 401 takes the average of N1 samples; while, in low bandwidth mode, the threshold calculation unit 401 takes the average of N2 samples. Because N2 is greater than N1, consistent with the discussions provided above, less samples are averaged in high bandwidth mode (as compared to low bandwidth mode).

It is important to point that the value of X may vary from embodiment to embodiment. That is, the example of FIG. 5 wherein the value of X corresponds to the amplitude of the A/D converter output signal waveform is just one of many different values that X may be positioned at. In general, the position of X may be configured by those of ordinary skill to a value that is appropriate for their particular design (e.g., outside the waveform amplitude or within the waveform amplitude).

Note that threshold calculation techniques other than averaging may be undertaken by the threshold calculation unit 401. For example, passing a series of A/D converter samples through a low pass filter is mathematically similar to the activity of taking an average. As such, in another embodiment, the threshold calculation unit 401 corresponds to an infinite impulse response (IIR) low pass filter.

In a related embodiment, the IIR low pass filter has a response expressed as:

$$y(k)=(1-\text{Gain}) \times y(k-1) + \text{Gain} \times X(k) \qquad \text{Eqn. 1}$$

where: 1) y(k) is the threshold value calculated by the threshold calculation unit; 2) X(k) is the sampled baseband signal (such as an A/D converter output signal); and 3) "Gain" is a parameter that determines the bandwidth of the filter. For threshold calculation techniques that pass a signal through a low pass filter, lowering the bandwidth will provide a more accurate threshold that adjusts more slowly to a sudden change in the signal (as compared to a higher bandwidth filter). As such, the bandwidth of the filter is consistent with the bandwidth terminology described above.

Note that the "Gain" parameter may be supplied by the multiplexer 405. That is, the high bandwidth indicator 420 may be embodied as the "Gain" parameter of Equation 1 that establishes the higher of the two bandwidths implemented by the filter. Similarly, the low bandwidth indicator 421 may be embodied as the "Gain" parameter of Equation 1 that establishes the lower of the two bandwidths implemented by the filter. In alternate embodiments, a finite impulse response (FIR) filter may be used or a filter that is described in the frequency domain (in this later case, a frequency domain representation of the baseband signal should be provided).

It is important to point out that the slicer embodiment 410 of FIG. 4 may be applied to other channels beside the particular receive channel 209 shown in FIG. 2. For example, in one alternative embodiment, a pure analog baseband signal is sliced by the slicer. That is, for example, the input signal of the slicer corresponds to the output of a demodulator 206 rather than the output of an A/D converter. A such, the threshold calculation unit 401 may be designed as an analog circuit.

It is also important to point out that the slicer approach described herein is not to be construed as limited to BLUETOOTH applications. That is, the approach described herein is applicable to any signal reception or processing environment where quick recovery from an offset is desirable. Examples include any FSK channel such as a Home RF receive channel or an IEEE 802.11 receive channel or a DECT receive channel. It is also important to note that other feedback loop designs (i.e., other than the particular design of FIG. 4) may be crafted so as to properly modulate the bandwidth of the threshold calculation unit.

Figure 6:
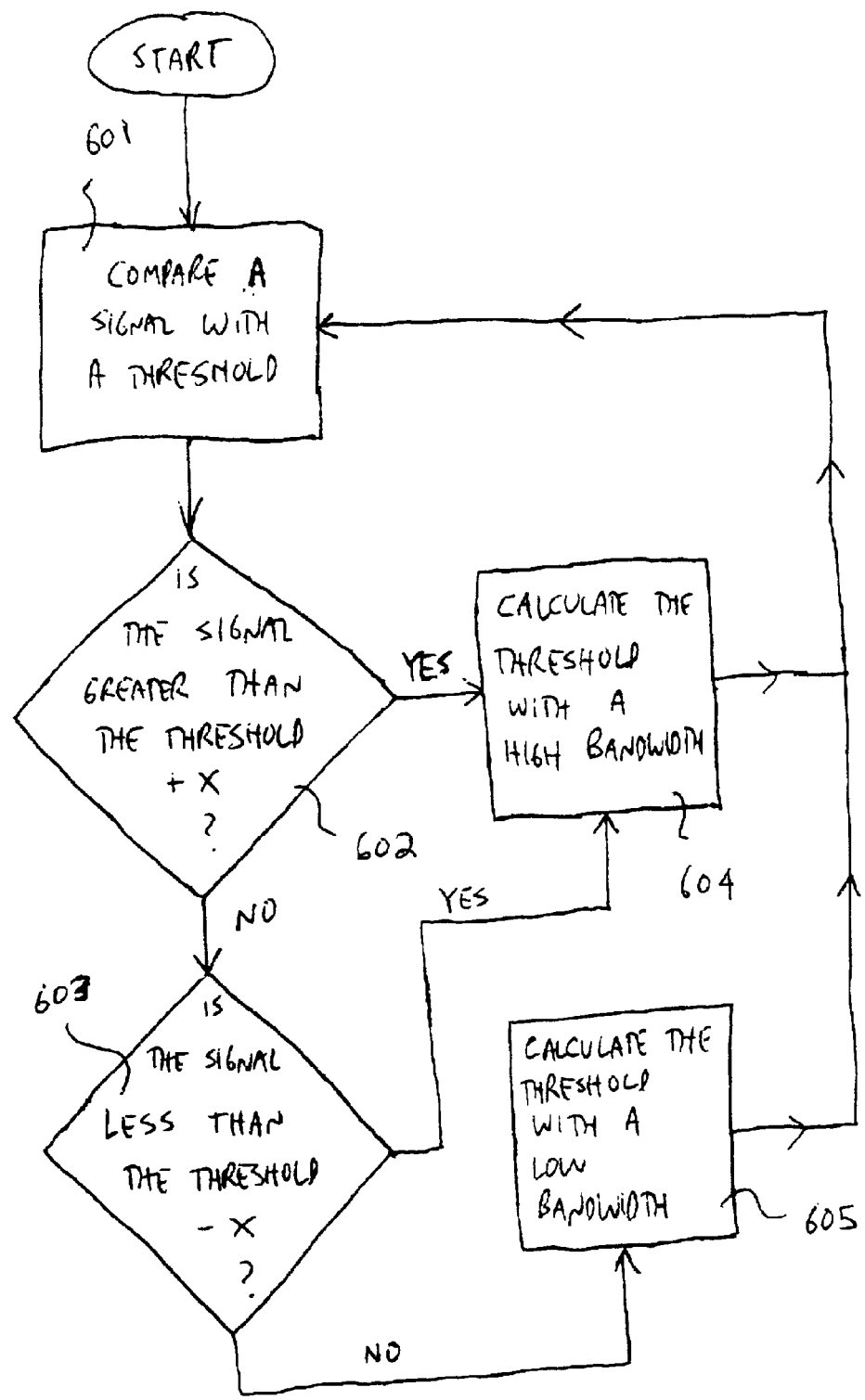
FIG. 6 shows an exemplary embodiment of a methodology executed by the slicer approach of FIG. 4.

To review, FIG. 6 shows an embodiment of a methodology 600 executed by the slicer approach of FIG. 4. According to the methodology 600 of FIG. 6, a signal is compared 601 with a threshold. If the signal is greater 602 than TH+X or less 603 than TH−X, the threshold is calculated 604 according to a high bandwidth. If a signal is not greater than TH+X and is not less than TH−X, the threshold is calculated 605 according to a low bandwidth.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
a) a threshold calculation unit having an input that receives an input signal, said threshold calculation unit having an output that provides a threshold to slice said input signal, said threshold calculation unit having a first bandwidth and a second bandwidth, said first bandwidth greater than said second bandwidth; and
b) a feedback loop that receives an indication of a difference between said input signal and said threshold, said feedback loop having an output that controls which of the bandwidths said threshold calculation unit calculates said threshold according to, said feedback loop output indicating said first bandwidth if an absolute value of said difference is greater than a first value, said feedback loop output indicating said second bandwidth if said absolute value of said difference is less than said first value.

2. The apparatus of claim 1 wherein said first value corresponds to an amplitude of a waveform of said input signal.

3. The apparatus of claim 1 wherein said threshold calculation unit computes an average of said input signal.

4. The apparatus of claim 3 wherein said first and second bandwidths each correspond to a different extent over which said input signal is averaged, said input signal averaged over a greater extent for said second bandwidth than said first bandwidth.

5. The apparatus of claim 1 wherein said threshold calculation unit corresponds to a low pass filter.

6. The apparatus of claim 5 wherein said low pass filter is an infinite impulse response filter.

7. The apparatus of claim 1 wherein said input is coupled to an analog to digital converter.

8. The apparatus of claim 1 further comprising a comparator having an output that provides said sliced input signal, said comparator output equal to a first logic level if said input signal is greater than said threshold, said comparator output equal to a second logic level if said input signal is less than said threshold.

9. The apparatus of claim 8 wherein said comparator output is coupled to a correlator.

10. The apparatus of claim 1 wherein said feedback loop output provides a first bandwidth parameter that sets said first bandwidth and a second bandwidth parameter that sets said second bandwidth.

11. The apparatus of claim 10 wherein said first and second bandwidth parameters respectively correspond to a first gain parameter and a second gain parameter, said threshold calculation unit corresponding to a low pass filter, said first gain parameter setting said first bandwidth, said second gain parameter setting said second bandwidth.

12. The apparatus of claim 1 wherein said feedback loop further comprises an absolute value unit having an input coupled to said feedback loop input, said absolute value unit having an output coupled to a first input of a comparator, said comparator having a second input coupled to said first value, said comparator having an output coupled to a channel select input of a multiplexer, said multiplexer having an output coupled to said feedback loop output, said multiplexer having a first input that provides said indication of said first bandwidth, said multiplexer having a second input that provides said indication of said second bandwidth.

13. A method, comprising:
determining a difference between a signal and a threshold used to slice said signal;
calculating said threshold according to a first bandwidth if an absolute value of said difference is greater than a first value; and
calculating said threshold according to a second bandwidth if said absolute value of said difference is less than said first value, said first bandwidth greater than said second bandwidth.

14. The method of claim 13 wherein said first value corresponds to an amplitude of a waveform of said signal.

15. The method of claim 13 wherein each said calculating further comprises computing an average of said signal.

16. The method of claim 15 wherein the bandwidths each correspond to a different extent over which said signal is averaged, said input signal being averaged over a greater extent for said second bandwidth than said first bandwidth.

17. The method of claim 13 wherein each said calculating further comprises passing said signal through a low pass filter.

18. The method of claim 17 wherein said low pass filter is an infinite impulse response filter.

19. The method of claim 13 wherein said signal further comprises digital words that correspond to samples of an analog signal.

20. The method of claim 13 further comprising providing the sliced signal by presenting a first logic level if said signal is greater than said threshold and presenting a second logic level if said input signal is less than said threshold.

21. The method of claim 13 further comprising correlating the sliced signal with a sought for pattern.

22. The method of claim 13 further comprising providing to a threshold calculation unit a first bandwidth parameter that sets said first bandwidth and a second bandwidth parameter that sets said second bandwidth.

23. The method of claim 22 wherein said first and second bandwidth parameters respectively correspond to a first gain parameter and a second gain parameter, said threshold calculation unit corresponding to a low pass filter, said first gain parameter setting said first bandwidth, said second gain parameter setting said second bandwidth.

24. The method of claim 13 further comprising determining said absolute value of said difference and comparing said absolute value with said first value, said comparing triggering the transmission of a bandwidth indicator to a threshold calculation unit, said bandwidth indicator indicating which of the bandwidths said threshold calculation unit is to perform said calculating according to.

25. An article of manufacture that comprises a description of a semiconductor circuit, said semiconductor circuit comprising:
   a) a threshold calculation unit having an input that receives an input signal, said threshold calculation unit having an output that provides a threshold that slices said input signal, said threshold calculation unit having a first bandwidth and a second bandwidth, said first bandwidth greater than said second bandwidth; and
   b) a feedback loop that receives an indication of a difference between said input signal and said threshold, said feedback loop having an output that controls which of the bandwidths said threshold calculation unit calculates said threshold according to, said feedback loop output indicating said first bandwidth if the absolute value of said difference is greater than a first value, said feedback loop output indicating said second bandwidth if the absolute value of said difference is less than said first value.

26. The article of manufacture of claim 25 wherein said description further comprises a behavioral level description of said circuit.

27. The article of manufacture of claim 26 wherein said behavioral level description is compatible with a VHDL format.

28. The article of manufacture of claim 26 wherein said behavioral level description is compatible with a Verilog format.

29. The article of manufacture of claim 25 wherein said description further comprises a register transfer level netlist.

30. The article of manufacture of claim 25 wherein said description further comprises a transistor level netlist.

31. A method, comprising:
   calculating a threshold for a signal according to a first bandwidth if said signal is greater than said threshold plus a first value or if said signal is less than said threshold minus said first value; and
   calculating said threshold for said signal according to a second bandwidth if said signal is not greater than said threshold plus said first value and if said signal is not less than said threshold minus said first value, said first bandwidth greater than said second bandwidth.

* * * * *